United States Patent
Koganehira et al.

(10) Patent No.: US 8,148,447 B2
(45) Date of Patent: Apr. 3, 2012

(54) INK COMPOSITION FOR INK JET RECORDING

(75) Inventors: Shuichi Koganehira, Nagano-Ken (JP); Hironori Sato, Nagano-Ken (JP); Kenji Ishizuki, Mie-Ken (JP); Takashi Mori, Mie-Ken (JP); Keiichi Bessho, Mie-Ken (JP)

(73) Assignee: Seiko Epson Corporation, Tokyo (JP)

( * ) Notice: Subject to any disclaimer, the term of this patent is extended or adjusted under 35 U.S.C. 154(b) by 398 days.

(21) Appl. No.: 11/322,155

(22) Filed: Dec. 29, 2005

(65) Prior Publication Data

US 2006/0160923 A1 Jul. 20, 2006

(30) Foreign Application Priority Data

Jan. 6, 2005 (JP) ................. 2005-001472

(51) Int. Cl.
*A61K 9/16* (2006.01)
*B05D 1/32* (2006.01)
*B32B 27/00* (2006.01)
*B41J 2/01* (2006.01)
*B41J 2/175* (2006.01)
*C09D 5/00* (2006.01)
*C09D 11/00* (2006.01)
*G01D 11/00* (2006.01)

(52) U.S. Cl. ............ 523/160; 106/31.13; 347/1; 347/85; 347/100; 427/466; 428/500; 523/161; 524/543

(58) Field of Classification Search .................. 523/160, 523/161; 106/31.13; 347/1, 85, 100; 427/466; 428/500; 524/543
See application file for complete search history.

(56) References Cited

U.S. PATENT DOCUMENTS

| | | | |
|---|---|---|---|
| 4,039,500 A * | 8/1977 | Bassett et al. ................. 524/804 |
| 4,395,515 A | 7/1983 | Dinklage et al. | |
| 5,545,678 A | 8/1996 | Giencke et al. | |
| 5,594,065 A * | 1/1997 | Tien et al. ..................... 524/507 |
| 5,721,313 A | 2/1998 | Yeung et al. | |
| 5,886,079 A | 3/1999 | Saibara et al. | |
| 6,239,193 B1 | 5/2001 | Cheng et al. | |
| 6,379,813 B1 | 4/2002 | Anderson et al. | |
| 6,437,037 B1 | 8/2002 | Hutter | |
| 6,852,777 B1 * | 2/2005 | Nakano et al. ................ 523/160 |
| 2004/0009294 A1 * | 1/2004 | Kuribayashi et al. ......... 427/212 |
| 2004/0024135 A1 | 2/2004 | Verge et al. | |

FOREIGN PATENT DOCUMENTS

| | | | |
|---|---|---|---|
| EP | 0 273 583 | | 7/1988 |
| EP | 1 057 843 | | 12/2000 |
| EP | 1 270 681 | | 1/2003 |
| EP | 1 333 074 | | 8/2003 |
| EP | 1 529 787 | | 5/2005 |
| EP | 1 555 274 | | 7/2005 |
| JP | 2003-3035 | | 1/2003 |
| JP | 2003-238856 | | 8/2003 |
| WO | WO 00/39226 | * | 7/2000 |
| WO | 02/24814 | | 3/2002 |
| WO | 2006/073149 | | 7/2006 |

OTHER PUBLICATIONS

English Abstract of WO 2006/073149 dated Jul. 13, 2006.
English Abstract of Japanese Application 2003-238856 Published Aug. 27, 2003.
English Abstract of Japanese Application 2003-3035 Published Jan. 8, 2003.

* cited by examiner

*Primary Examiner* — Patrick Niland

(74) *Attorney, Agent, or Firm* — Ladas & Parry LLP

(57) ABSTRACT

There is provided an ink composition which can yield images having silver salt photograph-like gloss and is also excellent in fixation, lightfastness, and gasfastness of recorded images. The ink composition comprises: a resin produced by emulsion polymerization of an ethylenically unsaturated monomer in the presence of a reactive emulsifier containing a hydrophilic group, a hydrophobic group and a radical reactive group; water; and a pigment.

17 Claims, No Drawings

INK COMPOSITION FOR INK JET RECORDING

BACKGROUND OF THE INVENTION

1. Field of the Invention

The present invention relates to an ink composition which can realize recorded images having excellent glossiness and, at the same time, having excellent ozonefastness and rubbing/scratch resistance.

2. Background Art

Ink jet recording is a recording method wherein ink droplets are flied from fine nozzles and are deposited on a recording medium to perform recording. Pigments are sometimes used as a colorant in ink compositions used as inks for ink jet recording from the viewpoint of improving lightfastness and waterfastness. Since such pigment-based ink compositions, however, sometimes only have unsatisfactory fixation onto recording media, various techniques have been developed.

In recent years, there is an increasing demand for higher-grade recorded images. Among others, various proposals have been made for further improving gloss of recorded images.

Further, prints prepared using ink compositions are placed indoors, as well as often outdoors, and, hence, are exposed to sunlight and outdoor air (such as ozone, nitrogen oxide and sulfur oxide). Although pigment-based ink compositions are superior to dye-based ink compositions in lightfastness and gasfastness, the pigment-based ink composition having further improved lightfastness and gasfastness are demanded.

To meet these demands, Japanese Patent Laid-Open No. 162043/2004 proposes the addition of a resin comprising a sulfonic acid group-containing polymer to a pigment-based ink composition. According to the patent publication, the ink composition is excellent in fixation of ink to recording media and glossiness, as well as in lightfastness and ozonefastness.

Japanese Patent Laid-Open No. 162043/2004, however, does not disclose a resin produced by emulsion polymerization of an ethylenically unsaturated monomer in the presence of a reactive emulsifier containing a hydrophilic group, a hydrophobic group and a radical reactive group.

SUMMARY OF THE INVENTION

The present inventors have now found that the addition of a specific resin to an ink composition can realize an ink composition that can yield images having a glossy impression comparable to that of silver salt photographs, as evaluated by the above proposed evaluation method and, at the same time, is also excellent in filxation, lightfastness and gasfastness of recorded images. The present invention has been made based on such finding.

Accordingly, an object of the present invention is to provide an ink composition which can yield images having a glossy impression comparable to that of silver salt photographs and is also excellent in fixation, light fastness and gasfastnss of recorded images.

According to the present invention, there is provided an ink composition comprising: a resin produced by emulsion polymerization of an ethylenically unsaturated monomer in the presence of a reactive emulsifier containing a hydrophilic group, a hydrophobic group and a radical reactive group; water; and a pigment.

The present invention can realize recorded images that have a glossy impression comparable to that of silver salt photographs and, at the same time, are excellent in fixation, lightfastness and gasfastness.

DETAILED DESCRIPTION OF THE INVENTION

The resin contained in the ink composition according to the present invention is produced by emulsion polymerization of an ethylenically unsaturated monomer in the presence of a reactive emulsifier containing a hydrophilic group, a hydrophobic group and a radical reactive group. The incorporation of this resin can realize recorded images that have a glossy impression comparable to that of silver salt photographs and, at the same time, are excellent in fixation, lightfastness and gasfastness. When the ethylenically unsaturated monomer is emulsion polymerized in the presence of a reactive emulsifier, the reactive emulsifier is consumed by polymerizing to reduce the amount of the free emulsifier remaining in a water-based ink composition. Consequently, without intending to be bound by theory, it is believed that glossiness and drying properties of the ink composition are improved by decreasing the free emulsifier in the ink composition. Further, in the case that the ink composition comprises a disperse resin, the free reactive emulsifier and the disperse resin are highly compatible with each other in the ink composition. Consequently, the ink composition comprising such resin according to the present invention can realize recorded images, which have a glossy impression comparable to that of silver salt photographs and, at the same time, are excellent in fixation, lightfastness and gasfastness.

The term "reactive emulsifier" as herein refers to an emulsifier that has an emulsifying capability good enough to cause emulsion polymerization and is radically polymerizable.

The reactive emulsifier is a compound comprising a hydrophilic group, a hydrophobic group, and a radically reactive group. Hydrophilic groups include sulfuric ester, carboxylic acid, and polyoxyethylene groups. Among these hydrophilic groups, sulfuric ester and polyoxyethylene groups are particularly preferred. Simultaneous presence of sulfuric ester and polyoxyethylene groups is more preferred.

For example, aliphatic alkyl or aromatic groups having 5 to 20 carbon atoms are preferred as the hydrophobic group constituting the reactive emulsifier. Among them, aliphatic alkyl groups having 8 to 15 carbon atoms and the like are more preferred.

Radical reactive group constituting the reactive emulsifier include, for example, ethylenically unsaturated groups such as acryl, methacryl, allyloxy, methallyloxy, and propenyl groups. Among them, allyloxy and propenyl groups are particularly preferred.

Examples of preferred reactive emulsifiers usable in the present invention include the following compounds.

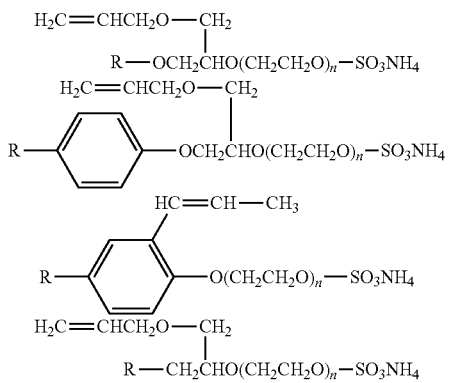

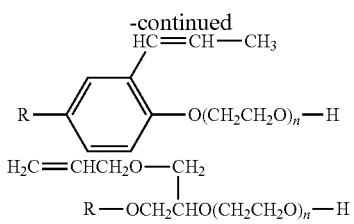

wherein R represents a $C_5$ to $C_{20}$ alkyl group; and n is an integer of 5 to 40.

Specific examples of suitable reactive emulsifiers in which the hydrophilic group is an anionic functional group include Latemul S-180 A (manufactured by Kao Corp.), Eleminol JS-2 (manufactured by Sanyo Chemical Industries, Ltd.), Aqualon KH-10, Aqualon HS-10, and Aqualon BC-10 (manufactured by Dai-Ichi Kogyo Seiyaku Co., Ltd.), Adeka Reasoap SE-10 N (manufactured by Asahi Denka Kogyo Ltd.) and the like. Reactive emulsifiers in which the hydrophilic group is a cationic functional group are also preferred. Examples of suitable reactive emulsifiers in which the hydrophilic group is a nonionic functional group include Aqualon RS-20 (manufactured by Dai-Ichi Kogyo Seiyaku Co., Ltd.), Adeka Reasoap ER-20 (manufactured by Asahi Denka Kogyo Ltd.) and the like. The above reactive emulsifiers may be used either solely or in a combination of two or more.

The content of the reactive emulsifier in the ink composition is preferably 0.5 to 5 parts by weight, more preferably 0.5 to 3 parts by weight, based on 100 parts by weight of the ethylenically unsaturated monomer, although the content of the reactive emulsifier depends upon the particle diameter of the resin emulsion which will be described later. When the reactive emulsifier is contained in this content range, the emulsion polymerization can be stably carried out and, at the same time, the resin is sufficiently emulsified. Further, when the reactive emulsifier is added to the ink composition, a problem of foaming does not occur.

In the ink composition according to the present invention anionic emulsifiers, nonionic emulsifiers, cationic emulsifiers, amphoteric ion emulsifiers, or nonreactive emulsifiers such as water soluble resins may be added in addition to the above reaction emulsifier. The use of a combination of the reactive emulsifier with the nonreactive emulsifier sometimes improves the storage stability of the emulsion.

Anionic emulsifiers include, for example, alkali metal salts of higher alcohol sulfates, alkali metal salts of alkylbenzenesulfonic acids, alkali metal salts of succinic acid dialkyl ester sulfonic acids, alkali metal salts of alkyldiphenyletherdisulfonic acids, sulfate salts of polyoxyethylene alkyl ethers, sulfate salts of polyoxyethylene alkyl phenyl ethers, phosphate salts of polyoxyethylene alkyl ethers, and phosphate salts of polyoxyethylene alkyl phenyl ethers.

Nonionic emulsifiers include, for example, polyoxyethylene alkyl ethers, polyoxyethylene alkyl phenyl ethers, and alkyl ethers in which the hydrophilic group is a sugar chain.

Cationic emulsifiers include alkyl pyridinyl chlorides and alkylammonium chlorides.

Amphoteric ion emulsifiers include lauryl betaine.

Water-soluble resins include alkali neutralization products of polycarboxylic acid polymers produced by copolymerizing an aromatic monomer with a carboxyl group-containing monomer, polyvinyl alcohols, and enzymatically degraded starch.

These nonreactive emulsifiers may be used either solely or in a combination of two or more.

The content of the nonreactive emulsifier in the ink composition is preferably not more than 5 parts by weight based on 100 parts by weight of the ethylenically unsaturated monomer. When the water soluble resin is used as the nonreactive emulsifier, the content of the nonreactive emulsifier is preferably not more than 50 parts by weight based on 100 parts by weight of the ethylenically unsaturated monomer.

The resin constituting the ink composition according to the present invention is produced by emulsion polymerization of an ethylenically unsaturated monomer in the presence of the above reactive emulsifier. The ethylenically unsaturated monomer utilized in the emulsion polymerization is not particularly limited, and examples thereof include diene monomers such as 1,3-butadiene, 1,2-butadiene, 1,2-pentadiene, 1,3-pentadiene, 2,3-pentadiene, isoprene, 1,2-hexadiene, 1,3-hexadiene, 1,4-hexandiene, 1,5-hexadiene, 2,3-hexadiene, 2,4-hexadiene, 2,3-dimethyl-1,3-butadiene, 2-ethyl-1,3-butadiene, 1,2-heptadiene, 1,3-heptadiene, 1,4-heptadiene, 1,5-heptadiene, 1,6-heptadiene, 2,3-heptadiene, 2,5-heptadiene, 3,4-heptadiene, 3,5-heptadiene, cyclopentadiene, dicyclopentadiene, and ethylidene norbornene; aromatic monomers such as styrene, α-methylstyrene, o-methylstyrene, p-methylstyrene, m-methylstyrene, vinylnaphthalene, and divinylstyrene; alkyl (meth)acrylates such as methyl (meth) acrylate, ethyl (meth)acrylate, n-propyl (meth)acrylate, i-propyl (meth)acrylate, n-butyl (meth)acrylate, n-amyl (meth)acrylate, i-amyl (meth)acrylate, hexyl (meth)acrylate, 2-ethylhexyl (meth)acrylate, octyl (meth)acrylate, i-nonyl (meth)acrylate, decyl (meth)acrylate, hydroxymethyl (meth) acrylate, and hydroxyethyl (meth)acrylate; unsaturated carboxylic acids such as itaconic acid, fumaric acid, (meth) acrylic acid, maleic acid, and crotonic acid; ethylenically unsaturated carboxylic acid alkylamides such as (meth)acrylamide and N-methylolacrylamide; vinyl carboxylates such as vinyl acetate and vinyl propionate; anhydrides, monoalkylesters, or monoamides of ethylenically unsaturated dicarboxylic acids; aminoalkyl esters of ethylenically unsaturated carboxylic acids such as aminoethylacrylate, dimethylaminoethylacrylate, and butylaminoethylacrylate; ethylenically unsaturated carboxylic acid aminoalkylamides such as aminoethylacrylamide, dimethylaminomethylmethacrylamide, and methylaminopropylmethacrylamino; vinyl cyanide compounds such as (meth)acrylonitrile and α-chroloacrylonitrile; and unsaturated aliphatic glycidyl esters such as glycidyl (meth)acrylate. These monomers may be used either solely or in a combination of two or more.

Among the above monomers, 1,3-butadiene, isoprene, styrene, and alkyl (meth)acrylates which are (meth)acrylic monomers such as methyl (meth)acrylate, ethyl (meth)acrylate, n-butyl (meth)acrylate, and 2-ethylhexyl (meth)acrylate are preferred. Particularly preferred are alkyl (meth)acrylates.

The above ethylenically unsaturated monomers may contain functional groups such as alkoxysilane, epoxy, hydroxyl, or polyethylene oxide groups. The presence of such functional groups can improve compatibility of the resin with each ingredient in the ink composition. Among them, an alkoxysilane group-containing monomer is particularly preferred.

Alkoxysilane group-containing monomers include γ-methacryloxypropyltriethoxysilane, γ-acryloxypropyltriethoxysilane, γ-methacryloxypropyltrimethoxysilane, γ-acryloxypropyltrimethoxysilane, vinyltriethoxysilane, and vinyltrimethoxysilane. Epoxy group-containing monomers include glycidyl (meth)acrylate. Hydroxyl group-containing monomers include 2-hydroxyethylmethacrylate. Polyethylene oxide group-containing monomers include, for example, polyethylene glycol monomethacrylate which is available as Blemmer PE 200 (manufactured by Nippon Oils & Fats Co., Ltd.).

Preferably, the functional group-containing monomer is contained in an amount of not more than 10% by weight, more preferably not more than 5% by weight in the monomer conponent.

The resin is produced by emulsion polymerization of the above ethylenically unsaturated monomer in the presence of a reactive emulsifier comprising a hydrophilic group, a hydrophobic group, and a radical reactive group.

The emulsion polymerization is carried out by mixing 100 parts by weight of the ethylenically unsaturated monomer with 0.5 to 5 parts by weight of the reactive emulsifier, and 100 to 5,000 parts by weight of water together, adding an ethylenically unsaturated monomer and a radical polymerization initiator to the mixture, and allowing a reaction to proceed at a polymerization temperature of 5 to 100° C. for 0.1 to 10 hr. The polymerization temperature is preferably 30 to 90° C., and the polymerization time is preferably 2 to 5 hr.

Suitable radical polymerization agents include: redox initiators comprising a combination of an oxidizing agent comprising an organic hydroperoxide such as cumene hydroperoxide, diisopropylbenzene peroxide, or diisopropylbenzene hydroperoxide with a reducing agent of a sugar-containing pyrophosphoric acid/sulfoxylate mixture; persulfates such as potassium persulfate and ammonium persulfate; azo initiators such as azobisisobutyronitrile, dimethyl-2,2'-azobisisobutylate, 2-carbamoylazoisobutyronitrile; and organic peroxides such as benzoyl peroxide and lauroyl peroxide. Among them, organic peroxides are preferred.

In the emulsion polymerization, if necessary, other emulsifiers, organic solvents and the like may be used. The method for the addition of the ethyleically unsaturated monomer is not particularly limited and may be any of at-once addition, continuous addition, divided addition and the like.

In the present invention, preferably, the ethylenically unsaturated monomer is emulsion polymerized in the presence of a chain transfer agent in addition to the reactive emulsifier. The combined use of the reactive emulsifier and the chain transfer agent can realize recorded images having further improved glossy impression, fixation, lightfastness, and gasfastness. The reason for this has not been fully elucidated yet, but is believed to reside in that, in the emulsion polymerization, the chain transfer agent is bonded to the polymer end of the resin. However, it should be noted that the above mechanism is hypothetical and should not be construed as limiting the scope of the present invention.

Chain transfer agents usable herein include, for example, mercaptans such as octyl mercaptan, n-dodecyl mercaptan, t-dodecyl mercaptan, n-hexadecyl mercaptan, n-tetradecyl mercaptan, and t-tetradecyl mercaptan; xanthogen disulfides such as dimethylxanthogen disulfide, diethylxanthogen disulfide, and diisopropylxanthogen disulfide; thiuram disulfides such as tetramethylthiuram disulfide, tetraethylthiuram disulfide, and tetrabutylthiuram disulfide; halogenated hydrocarbons such as carbon tetrachloride and ethylene bromide; hydrocarbons such as pentaphenylethane, 1,1-diphenylethylene, and α-methylstyrene dimer; and other chain transfer agents such as acrolein, methacrolein, ally alcohol, 2-ethylhexylthioglycolate, terpinolene, α-terpinene, γ-terpinene, and dipentene. Among them, mercaptans, xanthogen disulfides, thiuram disulfides, carbon tetrachloride, 1,1-diphenylethylene, α-methylstyrene dimer, and 2-ethylhexylthioglycolate are preferred. The above chain transfer agents may be used either solely or in a combination of two or more.

The amount of the chain transfer agent added is preferably 0.1 to 10 parts by weight, preferably 0.2 to 7 parts by weight, more preferably 0.2 to 5 parts by weight, particularly preferably 0.3 to 3 parts by weight, based on 100 parts by weight in total of the ethylenically unsaturated monomer and the reactive emulsifier. When the amount of the chain transfer agent added is in the above-defined amount range, the glossiness of the record is further improved and, at the same time, satisfactory rubbing/scratch resistance can be provided.

The resin thus obtained is present in an emulsion form in the polymerization solution. In the ink composition according to the present invention, the resin is preferably present in an emulsion form in the ink composition (hereinafter referred to as "resin emulsion"). The average particle diameter of the resin emulsion is preferably 10 to 100 nm, more preferably 30 to 60 nm. When the average particle diameter is more than 100 nm, the storage stability becomes unstable and the formation of a thin and even film by electrodeposition is difficult. Further, compatibility with each ingredient in the ink composition is lowered. On the other hand, when the average particle diameter is less than 10 nm, the polymerization stability is significantly deteriorated. The average particle diameter may be regulated by varying the type and mixing ratio of the monomer and the amount of the chain transfer agent and emulsifier added. In the present invention, the average particle diameter refers to a value as measured with Photal PAR-III (manufactured by Otsuka Electronics Co., Ltd.).

The weight average molecular weight of the resin thus obtained is preferably 10,000 to 100,000, more preferably 30,000 to 70,000. When the resin has relatively low molecular weight, the emulsion is easily fused upon ink drying. The weight-average molecular weight of the resin may be regulated, for example, by varying the type and addition amount of the polymerization initiator or by using a chain transfer agent.

The ink composition according to the present invention comprises the resin (resin emulsion) prepared above, water, and a pigment. The type of the pigment is not particularly limited, and any of inorganic pigments and organic pigments may be used. Inorganic pigments include, in addition to titanium oxide and iron oxide, carbon blacks produced by known processes, such as contact, furnace, and thermal processes. In the ink composition according to the present invention, if necessary, in addition to the pigment, conventional dyes may be added. Organic pigments usable herein include azo pigments such as insoluble azo pigment, condensed azo pigment, azo lake, and chelate azo pigment; polycyclic pigments, for example, phthalocyanine, perylene, perinone, anthraquinone, quinacridone, dioxane, thioindigo, isoindolinone, and quinophthalone pigments; dye chelates, for example, basic dye chelates and acid dye chelates; nitro pigments; nitroso pigments; aniline black; and fluorescent pigment. The pigments may be used either solely or in a combination of two or more.

Specific examples of carbon blacks usable as pigments include No. 2300, No. 900, HCF 88, No. 33, No. 40, No. 45, No. 52, MA 7, MA 8, MA 100, and No. 2200 B, which are manufactured by Mitsubishi Chemical Corporation; Raven 5750, Raven 5250, Raven 5000, Raven 3500, Raven 1255, and Raven 700, which are manufactured by Columbian Carbon Co., Ltd.; Regal 400 R, Regal 330 R, Regal 660 R, Mogul L, Mogul 700, Monarch 800, Monarch 880, Monarch 900, Monarch 1000, Monarch 1100, Monarch 1300, and Monarch 1400, which are manufactured by Cabot Corporation; Color Black FW 1, Color Black FW 2V, Color Black FW 18, Color Black FW 200, Color Black S 150, Color Black S 160, Color Black S 170, Printex 35, Printex U, Printex V, Printex 140 U, Special Black 6, Special Black 5, Special Black 4A, and Special Black 4, which are manufactured by Degussa. They may be used either solely or in a combination of two or more.

Pigments usable in yellow ink compositions include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 109, C.I. Pigment Yellow 110, C.I. Pigment Yellow 114, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 180, and C.I. Pigment Yellow 185. The pigment is preferably one pigment or a mixture of two or more pigments selected from the group consisting of C.I. Pigment Yellow 74, C.I. Pigment Yellow 109, C.I. Pigment Yellow 110, C.I. Pigment Yellow 128, and C.I. Pigment Yellow 138.

Pigments usable in magenta ink compositions and light magenta ink compositions include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 15: 1, C.I. Pigment Red 112, C.I. Pigment Red 122, C.I. Pigment Red 123, C.I. Pigment Red 168, C.I. Pigment Red 184, C.I. Pigment Red 202, C.I. Pigment Red 209, and C.I. Pigment Violet 19. The pigment is preferably one pigment or a mixture of two or more pigments selected from the group consisting of C.I. Pigment Red 122, C.I. Pigment Red 202, C.I. Pigment Red 209, and C.I. Pigment Violet 19.

Pigments usable in cyan ink compositions and light cyan ink compositions include C.I. Pigment Blue 1, C.I. Pigment Blue 2, C.I. Pigment Blue 3, C.I. Pigment Blue 15: 3, C.I. Pigment Blue 15: 4, C.I. Pigment Blue 15: 34, C.I. Pigment Blue 16, C.I. Pigment Blue 22, C.I. Pigment Blue 60, C.I. Vat Blue 4, and C.I. Vat Blue 60. The pigment is preferably one pigment or a mixture of two or more pigments selected from the group consisting of C.I. Pigment Blue 15: 3, C.I. Pigment Blue 15: 4, and C.I. Pigment Blue 60.

In a preferred embodiment of the present invention, the pigment used in the present invention has an average particle diameter in the range of 10 to 200 nm, more preferably about 50 to 150 nm.

The mixing amount of the pigment utilized in the present invention may be properly determined. Preferably, however, the pigment is mixed in an amount of 0.1 to 20% by weight, more preferably 0.2 to 10% by weight, in the ink composition.

The mixing amount of the pigment is properly regulated depending upon the type of ink compositions such as shading ink compositions. In particular, the content of the pigment in a light ink composition is preferably 0.1 to 1.3% by weight, more preferably 0.4 to 1.0% by weight.

In a preferred embodiment of the present invention, the pigment utilized in the present invention is preferably added, to the ink, in the form of a pigment dispersion liquid prepared by dispersing the pigment in an aqueous medium with the aid of a dispersant.

Preferred dispersants usable in the ink composition according to the present invention include dispersants commonly used in the preparation of pigment dispersion liquids, polymeric dispersants, or surfactants.

Examples of preferred polymeric dispersants in the present invention include naturally occurring polymeric compounds, and specific examples thereof include proteins such as glue, gelatin, casein, and albumin; naturally occurring rubbers such as gum arabic and tragacanth; glucosides such as sabonin; alginic acid and alginic acid derivatives such as propylene glycol alginate, triethanolamine alginate, and ammonium alginate; and cellulose derivatives such as methylcellulose, carboxymethylcellulose, hydroxyethylcellulose, and ethylhydroxycellulose.

Examples of another preferred polymeric dispersants include synthetic polymers, and examples thereof include polyvinyl alcohols; polyvinyl pyrrolidones; acrylic copolymers such as polyacrylic acid, acrylic acid-acrylonitrile copolymer, potassium acrylate-acrylonitrile copolymer, vinyl acetate-acrylic ester copolymer, and acrylic acid-alkyl acrylate copolymer; styrene-acrylic acid resins such as styrene-acrylic acid copolymer, styrene-methacrylic acid copolymer, styrene-methacrylic acid-alkyl acrylate copolymer, styrene-α-methylstyrene-acrylic acid copolymer, and styrene-α-methylstyrene-acrylic acid-alkyl acrylate copolymer; styrene-maleic acid copolymer; styrene-maleic anhydride copolymer; vinyinaphthalene-acrylic acid copolymer; vinylnaphthalene-maleic acid copolymer; vinyl acetate copolymers such as vinyl acetate-ethylene copolymer, vinyl acetate-fatty acid vinylethylene copolymer, vinyl acetate-maleic ester copolymer, vinyl acetate-crotonic acid copolymer, and vinyl acetate-acrylic acid copolymer; and salts of the above polymers.

Among them, a carboxyl group-containing polymeric compound (the carboxyl group being preferably in a salt form) (for example, styrene-acrylic acid resins, styrene-maleic acid resins, styrene-maleic anhydride resins, vinylnaphthalene-acrylic acid copolymers, vinylnaphthalene-maleic acid copolymers, and vinyl acetate-acrylic acid copolymers), a copolymer of a monomer having a hydrophobic group with a monomer having a hydrophilic group and a polymer of a monomer having both a hydrophobic group and a hydrophilic group in its molecular structure are particularly preferred.

The salt as above include salts, for example, with diethylamine, ammonia, ethylamine, triethylamine, propylamine, isopropylamine, dipropylamine, butylamine, isobutylamine, triethanolamine, diethanolamine, aminomethyl propanol, or morpholine. For these (co)polymers, the weight average molecular weight is preferably 3,000 to 30,000, more preferably 5,000 to 15,000.

Examples of preferred surfactants as the dispersant include anionic surfactants such as fatty acid salts, higher alkyldicarboxylic acid salts, higher alcohol sulfuric ester salts, higher alkylsulfonic acid salts, condensates of higher fatty acids with amino acids, sulfosuccinic ester salts, naphthenic acid salts, liquid fatty oil sulfuric ester salts, and alkylallylsulfonic acid salts; cationic surfactants such as fatty acid amine salts, quaternary ammonium salts, sulfonium salts, and phosphoniums; and nonionic surfactants such as polyoxyethylene alkyl ethers, polyoxyethylene alkyl esters, sorbitan alkyl esters, and polyoxyethylene sorbitan alkyl esters. A person having ordinary skill in the art would appreciate that these surfactants, when added to the ink composition, function also as a surfactant.

Preferably, the ink composition according to the present invention comprises, in addition to the above ingredients, a penetrating agent and/or a surfactant.

Penetrating agents include glycol ethers and 1,2-alkanediols having 5 to 10 carbon atoms.

Specific examples of glycol ethers include ethylene glycol monomethyl ether, ethylene glycol monoethyl ether, ethylene glycol mono-iso-propyl ether, ethylene glycol mono-n-butyl ether, ethylene glycol mono-iso-butyl ether, ethylene glycol mono-tert-butyl ether, ethylene glycol monomethyl ether acetate, diethylene glycol monomethyl ether, diethylene glycol monoethyl ether, diethylene glycol mono-n-propyl ether, diethylene glycol mono-iso-propyl ether, diethylene glycol mono-n-butyl ether, diethylene glycol mono-tert-butyl ether, triethylene glycol mono-n-butyl ether, propylene glycol monomethyl ether, propylene glycol monoethyl ether, propylene glycol mono-n-propyl ether, propylene glycol mono-iso-propyl ether, propylene glycol mono-n-butyl ether, propylene glycol mono-tert-butyl ether, dipropylene glycol monomethyl ether, dipropylene glycol monoethyl ether, dipropylene glycol mono-n-propyl ether, dipropylene glycol-iso-propyl ether, dipropylene glycol mono-n-butyl ether, dipropylene glycol mono-tert-butyl ether, and 1-methyl-1-methoxybutanol. They may be used either solely or as a mixture of two or more.

Among the above glycol ethers, alkyl ethers of polyhydric alcohols are preferred. In particular, ethylene glycol monoethyl ether, ethylene glycol mono-n-butyl ether, diethylene glycol monomethyl ether, diethylene glycol monoethyl ether, diethylene glycol mono-n-butyl ether, triethylene glycol monomethyl ether, triethylene glycol monoethyl ether, or triethylene glycol mono-n-butyl ether is preferred. Triethylene glycol mono-n-butyl ether is more preferred.

Examples of 1,2-alkanediols having 5 to 10 carbon atoms include 1,2-pentanediol, 1,2-hexanediol, and 1,2-heptanediol. 1,2-Alkanediols may be used either solely or in a combination of two or more. The glossy impression of prints can be significantly improved by adding an 1,2-alkanediols having 5 to 10 carbon atoms to the ink composition containing a resin produced by emulsion polymerization of an ethylenically unsaturated monomer in the presence of a reactive emulsifier comprising a hydrophilic group, a hydrophobic group, and a radical reactive group.

The amount of the penetrating agent added may be properly determined. Preferably, however, the amount of the penetrating agent added is about 0.1 to 30% by weight, more preferably about 1 to 20% by weight.

Surfactants include anionic surfactants (for example, sodium dodecylbenzenesulfonate, sodium laurylsulfate, and ammonium salts of polyoxyethylene alkyl ether sulfates), nonionic surfactants (for example, polyoxyethylene alkyl ethers, polyoxyethylene alkyl esters, polyoxyethylene sorbitan fatty acid esters, polyoxyethylene alkylphenyl ethers, polyoxyethylenealkylamines, and polyoxyethylenealkylamides). They may be used either solely or in a combination of two or more.

Among them, acetylene glycol compounds and polyether-modified organosiloxane compounds are preferred from the viewpoint of improving the gloss impression of prints. Further, the polyether-modified organosiloxane compound, when used in combination with the 1,2-alkanediol, can further improve the glossy impression of prints.

The acetylene glycol compound and the polyether-modified organosiloxane compound may be commercially available products. Suitable acetylene glycol compounds include, for example, Surfynol 61, Surfynol 104, Surfynol 420, Surfynol 440, Surfynol 465, Surfynol SE, Surfynol SEF, and Surfynol 504, commercially available from Air Products and Chemicals, Inc. Suitable polyether-modified organosiloxane compounds include, for example, silicone surfactants BYK-345, BYK-346, BYK-347, BYK UV-3510, or BYK-348, commercially available from BYK-Chemie Japan K.K.

The ink composition of the present invention preferably further comprises a wetting agent. Polyhydric alcohols are suitable as the wetting agent. Specific examples of polyhydric alcohols include glycerin, ethylene glycol, diethylene glycol, and triethylene glycol.

The amount of the wetting agent added may be properly determined. Preferably, however, the addition amount of the wetting agent is 0.1 to 30% by weight, more preferably about 1 to 20% by weight. It would be apparent to a person having ordinary skill in the art that a part of the penetrating solvent functions also as a wetting agent.

The ink composition according to the present invention may further comprise nozzle clogging preventives, preservatives, antioxidants, electric conductivity adjustors, pH adjustors, viscosity modifiers, surface tension modifiers, oxygen absorbers and the like.

Examples of preservatives or fungicides include sodium benzoate, pentachlorophenol sodium, 2-pyridinethiol-1-oxide sodium, sodium sorbate, sodium dehydroacetate, and 1,2-dibenzinethiazolin-3-one (Proxel CRL, Proxel BND, Proxel GXL, Proxel XL-2, and Proxel TN, manufactured by ICI).

Examples of pH adjustors, solubilizers, or antioxidants include: amines, such as diethanolamine, triethanolamine, propanolamine, and morpholine, and modification products thereof; inorganic salts, such as potassium hydroxide, sodium hydroxide, and lithium hydroxide; ammonium hydroxide; quaternary ammonium hydroxide, such as tetramethylammonium; salts of carbonic acid, such as potassium carbonate, sodium carbonate, and lithium carbonate; salts of phosphoric acid, such as potassium phosphate, sodium phosphate, and lithium phosphate; N-methyl-2-pyrrolidone; urea compounds, such as urea, thiourea, and tetramethylurea; allophanates, such as allophanate and methyl allophanate; biurets, such as biuret, dimethylbiuret, and tetramethylbiuret; and L-ascorbic acid and salts thereof.

The ink composition according to the present invention may comprise an antioxidant and an ultraviolet absorber, and examples thereof include Tinuvin 328, 900, 1130, 384, 292, 123, 144, 622, 770, and 292, Irgacor 252 and 153, and Irganox 1010, 1076, 1035, and MD 1024, manufactured by Ciba Specialty Chemicals, K.K.; and lanthanide oxides.

The ink composition according to the present invention may be prepared by dispersing and mixing the above ingredients together by means of a suitable method. A preferred production process is as follows. At the outset, a homogeneous pigment dispersion is prepared by mixing a pigment, a polymeric dispersant and water by means of a suitable dispergator (for example, a ball mill, a sand mill, an attritor, a roll mill, an agitator mill, a Henschel mixer, a colloid mill, an ultrasonic homogenizer, a jet mill, or an angmill). Subsequently, an ink solution is prepared by adding a separately prepared resin (a resin emulsion), water, a water soluble organic solvent, sugar, a pH adjustor, a preservative, a fungicide and the like, and satisfactorily dissolving them. After thorough stirring, the mixture is filtered to remove coarse particles and foreign matter causative of nozzle clogging to obtain a contemplated ink composition.

According to the present invention, there is provided a recording method comprising forming an image on a recording medium using the above ink composition.

EXAMPLES

The following Examples further illustrate the present invention. However, it should be noted that the present invention is not limited to these Examples.

In the following Examples, "parts" and "%" are by weight unless otherwise specified.

(1) Preparation of Resin Emulsions

<Resin Emulsion 1>

The following ingredients were placed in a 2-liter beaker and were stirred at 100 rpm for 10 min to prepare a monomer emulsion.

| Ethylenically unsaturated monomer: | |
|---|---|
| Methyl methacrylate | 348 g (58 parts) |
| Butyl acrylate | 240 g (40 parts) |
| Acrylic acid | 12 g (2 parts) |
| Reactive emulsifier: | |
| 15% aqueous solution of Aqualon KH-10 (containing sulfuric ester group and polyoxyethylene group; manufactured by Dai-Ichi Kogyo Seiyaku Co., Ltd.) | 30 g |
| Chain transfer agent: | |
| 2-Ethylhexylthioglycolate | 6 g |
| Water: | 450 g |

Next, 520 g of water and 90 g of the same reactive emulsifier (15% aqueous solution) as described above were placed in a 2-L separable flask and were heated to 60° C. with stirring at 180 rpm. 2 g of ammonium persulfate was added, and the temperature of the mixture was raised to 70° C.

The monomer emulsion thus obtained was gradually added to this aqueous reactive emulsifier solution while maintaining the polymerization temperature at 75° C. over a period of 3 hr to perform emulsion polymerization. Thereafter, the polymerization solution was heated to 80° C., followed by ripening for one hr and cooling. Next, the polymerization solution was neutralized and adjusted to pH 7.3 by the addition of a 10% aqueous ammonia solution.

<Resin Emulsion 2>

The following ingredients were placed in a 2-liter beaker and were stirred at 100 rpm for 10 min to prepare a monomer emulsion.

| Ethylenically unsaturated monomer: | |
|---|---|
| Styrene | 360 g (60 parts) |
| Butyl acrylate | 228 g (38 parts) |
| Acrylic acid | 12 g (2 parts) |
| Reactive emulsifier: | |
| 15% aqueous solution of Aqualon KH-10 (containing sulfuric ester group and polyoxyethylene group; manufactured by Dai-Ichi Kogyo Seiyaku Co., Ltd.) | 30 g |
| Chain transfer agent: | |
| 2-Ethylhexylthioglycolate | 6 g |
| Water: | 450 g |

Next, 520 g of water and 90 g of the same reactive emulsifier (15%/o aqueous solution) as described above were placed in a 2-L separable flask and were heated to 60° C. with stirring at 180 rpm. 2 g of ammonium persulfate was added, and the temperature of the mixture was raised to 70° C.

The monomer emulsion thus obtained was gradually added to this aqueous reactive emulsifier solution while maintaining the polymerization temperature at 75° C. over a period of 3 hr to perform emulsion polymerization. Thereafter, the polymerization solution was heated to 80° C., followed by ripening for one hr and cooling. Next, the polymerization solution was neutralized and adjusted to pH 7.3 by the addition of a 10% aqueous ammonia solution.

<Resin Emulsion 3>

The following ingredients were placed in a 2-liter beaker and were stirred at 100 rpm for 10 min to prepare a monomer emulsion.

| Ethylenically unsaturated monomer: | |
|---|---|
| Methyl methacrylate | 348 g (58 parts) |
| Butyl acrylate | 240 g (40 parts) |
| Acrylic acid | 12 g (2 parts) |
| Reactive emulsifier: | |
| 15% aqueous solution of Adeka Reasoap ER-20 (containing a polyoxyethylene group; manufactured by Asahi Denka Kogyo Ltd.) | 30 g |
| Chain transfer agent: | |
| 2-Ethylhexylthioglycolate | 6 g |
| Water: | 450 g |

Next, 520 g of water and 90 g of the same reactive emulsifier (15% aqueous solution) as described above were placed in a 2-L separable flask and were heated to 60° C. with stirring at 180 rpm. 2 g of ammonium persulfate was added, and the temperature of the mixture was raised to 70° C.

The monomer emulsion thus obtained was gradually added to this aqueous reactive emulsifier solution while maintaining the polymerization temperature at 75° C. over a period of 3 hr to perform emulsion polymerization. Thereafter, the polymerization solution was heated to 80° C., followed by ripening for one hr and cooling. Next, the polymerization solution was neutralized and adjusted to pH 7.3 by the addition of a 10% aqueous ammonia solution.

<Resin Emulsion 4>

The following ingredients were placed in a 2-liter beaker and were stirred at 100 rpm for 10 min to prepare a monomer emulsion.

| Ethylenically unsaturated monomer: | |
|---|---|
| Methyl methacrylate | 336 g (56 parts) |
| Butyl acrylate | 240 g (40 parts) |
| Acrylic acid | 12 g (2 parts) |
| γ-Methacryloxypropyl triethoxysilane | 12 g (2 parts) |
| Reactive emulsifier: | |
| 15% aqueous solution of Aqualon KH-10 (containing sulfuric ester group and polyoxyethylene group; manufactured by Dai-Ichi Kogyo Seiyaku Co., Ltd.) | 30 g |
| Chain transfer agent: | |
| 2-Ethylhexylthioglycolate | 6 g |
| Water: | 450 g |

Next, 520 g of water and 90 g of the same reactive emulsifier (15% aqueous solution) as described above were placed in a 2-L separable flask and were heated to 60° C. with stirring at 180 rpm. 2 g of ammonium persulfate was added, and the temperature of the mixture was raised to 70° C.

The monomer emulsion thus obtained was gradually added to this aqueous reactive emulsifier solution while maintaining the polymerization temperature at 75° C. over a period of 3 hr to perform emulsion polymerization. Thereafter, the polymerization solution was heated to 80° C., followed by ripening for one hr and cooling. Next, the polymerization solution was neutralized and adjusted to pH 7.3 by the addition of a 10% aqueous ammonia solution.

<Resin Emulsion 5>

The following ingredients were placed in a 2-liter beaker and were stirred at 100 rpm for 10 min to prepare a monomer emulsion.

| Ethylenically unsaturated monomer: | |
| --- | --- |
| Methyl methacrylate | 336 g (56 parts) |
| Butyl acrylate | 240 g (40 parts) |
| Acrylic acid | 12 g (2 parts) |
| γ-Methacryloxypropyl triethoxysilane | 12 g (2 parts) |
| Reactive emulsifier: | |
| 15% aqueous solution of Adeka Reasoap ER-20 (containing a polyoxyethylene group; manufactured by Asahi Denka Kogyo Ltd.) | 30 g |
| Chain transfer agent: | |
| 2-Ethylhexylthioglycolate | 6 g |
| Water: | 450 g |

Next, 520 g of water and 90 g of the same reactive emulsifier (15% aqueous solution) as described above were placed in a 2-L separable flask and were heated to 60° C. with stirring at 180 rpm. 2 g of ammonium persulfate was added, and the temperature of the mixture was raised to 70° C.

The monomer emulsion prepared above was gradually added to this aqueous reactive emulsifier solution while maintaining the polymerization temperature at 75° C. over a period of 3 hr to perform emulsion polymerization. Thereafter, the polymerization solution was heated to 80° C., followed by ripening for one hr and cooling. Next, the polymerization solution was neutralized and adjusted to pH 7.3 by the addition of a 10% aqueous ammonia solution.

<Resin Emulsion 6>

The following ingredients were placed in a 2-liter beaker and were stirred at 100 rpm for 10 min to prepare a monomer emulsion.

| Ethylenically unsaturated monomer: | |
| --- | --- |
| Methyl methacrylate | 348 g (58 parts) |
| Butyl acrylate | 240 g (40 parts) |
| Acrylic acid | 12 g (2 parts) |
| Reactive emulsifier: | |
| 15% aqueous solution of Aqualon KH-10 (containing sulfuric ester group and polyoxyethylene group; manufactured by Dai-Ichi Kogyo Seiyaku Co., Ltd.) | 30 g |
| Water: | 450 g |

Next, 520 g of water and 90 g of the same reactive emulsifier (15% aqueous solution) as described above were placed in a 2-L separable flask and were heated to 60° C. with stirring at 180 rpm. 2 g of ammonium persulfate was added, and the temperature of the mixture was raised to 70° C.

The monomer emulsion thus obtained was gradually added to this aqueous reactive emulsifier solution while maintaining the polymerization temperature at 75° C. over a period of 3 hr to perform emulsion polymerization. Thereafter, the polymerization solution was heated to 80° C., followed by ripening for one hr and cooling. Next, the polymerization solution was neutralized and adjusted to pH 7.3 by the addition of a 10% aqueous ammonia solution.

<Resin Emulsion 7>

The following ingredients were placed in a 2-liter beaker and were stirred at 100 rpm for 10 min to prepare a monomer emulsion.

| Ethylenically unsaturated monomer: | |
| --- | --- |
| Styrene | 360 g (60 parts) |
| Butyl acrylate | 228 g (38 parts) |
| Acrylic acid | 12 g (2 parts) |
| Reactive emulsifier: | |
| 15% aqueous solution of Aqualon KH-10 (containing sulfuric ester group and polyoxyethylene group; manufactured by Dai-Ichi Kogyo Seiyaku Co., Ltd.) | 30 g |
| Water: | 450 g |

Next, 520 g of water and 90 g of the same reactive emulsifier (15% aqueous solution) as described above were placed in a 2-L separable flask and were heated to 60° C. with stirring at 180 rpm. 2 g of ammonium persulfate was added, and the temperature of the mixture was raised to 70° C.

The monomer emulsion thus obtained was gradually added to this aqueous reactive emulsifier solution while maintaining the polymerization temperature at 75° C. over a period of 3 hr to perform emulsion polymerization. Thereafter, the polymerization solution was heated to 80° C., followed by ripening for one hr and cooling. Next, the polymerization solution was neutralized and adjusted to pH 7.3 by the addition of a 100% aqueous ammonia solution.

<Resin Emulsion 8>

The following ingredients were placed in a 2-liter beaker and were stirred at 100 rpm for 10 min to prepare a monomer emulsion.

| Ethylenically unsaturated monomer: | |
| --- | --- |
| Methyl methacrylate | 336 g (56 parts) |
| Butyl acrylate | 240 g (40 parts) |
| Acrylic acid | 12 g (2 parts) |
| γ-Methacryloxypropyl triethoxysilane | 12 g (2 parts) |
| Reactive emulsifier: | |
| 15% aqueous solution of Aqualon KH-10 (containing sulfuric ester group and polyoxyethylene group; manufactured by Dai-Ichi Kogyo Seiyaku Co., Ltd.) | 30 g |
| Water: | 450 g |

Next, 520 g of water and 90 g of the same reactive emulsifier (15% aqueous solution) as described above were placed in a 2-L separable flask and were heated to 60° C. with stirring at 180 rpm. 2 g of ammonium persulfate was added, and the temperature of the mixture was raised to 70° C.

The monomer emulsion thus obtained was gradually added to this aqueous reactive emulsifier solution while maintaining the polymerization temperature at 75° C. over a period of 3 hr to perform emulsion polymerization. Thereafter, the polymerization solution was heated to 80° C., followed by ripening for one hr and cooling. Next, the polymerization solution was neutralized and adjusted to pH 7.3 by the addition of a 10% aqueous ammonia solution.

<Resin Emulsion 9 (Comparative Example)>

The following ingredients were placed in a 2-liter beaker and were stirred at 100 rpm for 10 min to prepare a monomer emulsion.

| | |
|---|---|
| Ethylenically unsaturated monomer: | |
| Methyl methacrylate | 348 g (58 parts) |
| Butyl acrylate | 240 g (40 parts) |
| Acrylic acid | 12 g (2 parts) |
| Nonreactive emulsifier: | |
| 15% aqueous solution of sodium dodecylbenzenesulfonate | 30 g |
| Chain transfer agent: | |
| 2-Ethylhexylthioglycolate | 6 g |
| Water: | 450 g |

Next, 520 g of water and 90 g of the same nonreactive emulsifier (15% aqueous solution) as described above were placed in a 2-L separable flask and were heated to 60° C. with stirring at 180 rpm. 2 g of ammonium persulfate was added, and the temperature of the mixture was raised to 70° C.

The monomer emulsion thus obtained was gradually added to this aqueous nonreactive emulsifier solution while maintaining the polymerization temperature at 75° C. over a period of 3 hr to perform emulsion polymerization. Thereafter, the polymerization solution was heated to 80° C., followed by ripening for one hr and cooling. Next, the polymerization solution was neutralized and adjusted to pH 7.3 by the addition of a 10% aqueous ammonia solution.

(2) Evaluation of Properties of Resin Emulsions

Resin emulsions 1 to 9 thus obtained were evaluated for various properties, that is, polymerization stability, average particle diameter, film forming temperature, and weight average molecular weight.

<Evaluation of Polymerization Stability>

100 g of each resin emulsion was filtered through a 200-mesh wire gauze, and the solid matter left on the wire gauze was dried. The weight of the dried solid matter was measured to evaluate polymerization stability. The evaluation was carried out according to the following criteria.

The weigh of solid matter left on the wire gauze was not more than 0.002 g: ◯

The weigh of solid matter left on the wire gauze was more than 0.002 g: ×

The results were as shown in Table 1 below.

<Measurement of Average Particle Diameter>

The average particle diameter of the resin emulsions was measured with Photal PAR-III (manufactured by Otsuka Denshi K.K.). The results were as shown in Table 1 below.

<Measurement of Film Forming Temperature>

The film forming temperature of the resin emulsions was measured with a film forming temperature tester (manufactured by Rigaku Industrial Corporation). The results were as shown in Table 1 below.

<Measurement of Weight Average Molecular Weight>

The weight average molecular weight of the resin emulsions was measured with a GPC apparatus (SC8010 (GPC), manufactured by Tosoh Corporation). In this case, a calibration curve prepared using standard polystyrene was used, and measuring conditions were as follows.

Eluent: tetrahydrofuran
Column: G4000HXL
(manufactured by Tosoh Corporation)
Flow rate: 1000 μL/min
Column temp.: 40° C.

The results were as shown in Table 1 below.

TABLE 1

| Resin emulsion | Polymerization stability | Average particle diameter (nm) | Film forming temperature (° C.) | Weight average molecular weight (Mw) |
|---|---|---|---|---|
| 1 | ◯ | 50 | 15 | 45,000 |
| 2 | ◯ | 45 | 33 | 50,000 |
| 3 | ◯ | 50 | 15 | 50,000 |
| 4 | ◯ | 45 | 20 | 45,000 |
| 5 | ◯ | 50 | 20 | 45,000 |
| 6 | ◯ | 50 | 15 | 80,000 |
| 7 | ◯ | 60 | 35 | 95,000 |
| 8 | ◯ | 50 | 20 | 90,000 |
| 9 | ◯ | 70 | 20 | 95,000 |

(3) Preparation of Ink Composition

Ink compositions shown in Tables 2 to 6 below were prepared according to the following procedure. A pigment and a styrene-acrylic acid copolymer were mixed together, and the mixture was dispersed together with glass beads (diameter: 1.7 mm, amount: 1.5 times (by weight) larger than the mixture) for 2 hr in a sand mill (manufactured by Yasukawa Seisakusho). Thereafter, the glass beads were removed from the dispersions. The other additives were added to the dispersions, and the mixtures were stirred at room temperature for 20 min, followed by filtration through a 10 μm membrane filter to prepare ink compositions of Examples 1 to 32 and Comparative Examples 1 to 4.

TABLE 2

| Additive ingredients | | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Resin emulsion | 1 | 0.6 | 0.6 | 0.6 | 0.6 | — | — | — | — |
| | 2 | — | — | — | — | 0.6 | 0.6 | 0.6 | 0.6 |
| Pigment | P.Y. 74 | 3 | — | — | — | 3 | — | — | — |
| | P.V. 19 | — | 3 | — | — | — | 3 | — | — |
| | P.B. 15:3 | — | — | 3 | — | — | — | 3 | — |
| | P.B. 7 | — | — | — | 3 | — | — | — | 3 |
| Pigment dispersant | | 1.5 | 1.5 | 1.5 | 1.5 | 1.5 | 1.5 | 1.5 | 1.5 |
| Glycerin | | 15 | 15 | 15 | 15 | 15 | 15 | 15 | 15 |
| 1,2-hexanediol | | 15 | 15 | 15 | 15 | 15 | 15 | 15 | 15 |
| BYKUV 3510 | | 0.1 | 0.1 | 0.1 | 0.1 | 0.1 | 0.1 | 0.1 | 0.1 |
| Ultrapure water | | Balance | Balance | Balance | Balance | Balance | Balance | Balance | Balance |

In the table, pigment dispersant represents styrene-acrylic acid dispersed resin.

TABLE 3

| Additive ingredients | | Ex. 9 | Ex. 10 | Ex. 11 | Ex. 12 | Ex. 13 | Ex. 14 | Ex. 15 | Ex. 16 |
|---|---|---|---|---|---|---|---|---|---|
| Resin emulsion | 3 | 0.6 | 0.6 | 0.6 | 0.6 | — | — | — | — |
|  | 4 | — | — | — | — | 0.6 | 0.6 | 0.6 | 0.6 |
| Pigment | P.Y. 74 | 3 | — | — | — | 3 | — | — | — |
|  | P.V. 19 | — | 3 | — | — | — | 3 | — | — |
|  | P.B. 15:3 | — | — | 3 | — | — | — | 3 | — |
|  | P.B. 7 | — | — | — | 3 | — | — | — | 3 |
| Pigment dispersant | | 1.5 | 1.5 | 1.5 | 1.5 | 1.5 | 1.5 | 1.5 | 1.5 |
| Glycerin | | 15 | 15 | 15 | 15 | 15 | 15 | 15 | 15 |
| 1,2-hexanediol | | 15 | 15 | 15 | 15 | 15 | 15 | 15 | 15 |
| BYKUV 3510 | | 0.1 | 0.1 | 0.1 | 0.1 | 0.1 | 0.1 | 0.1 | 0.1 |
| Ultrapure water | | Balance | Balance | Balance | Balance | Balance | Balance | Balance | Balance |

In the table, pigment dispersant represents styrene-acrylic acid dispersed resin.

TABLE 4

| Additive ingredients | | Ex. 17 | Ex. 18 | Ex. 19 | Ex. 20 | Ex. 21 | Ex. 22 | Ex. 23 | Ex. 24 |
|---|---|---|---|---|---|---|---|---|---|
| Resin emulsion | 5 | 0.6 | 0.6 | 0.6 | 0.6 | — | — | — | — |
|  | 6 | — | — | — | — | 0.6 | 0.6 | 0.6 | 0.6 |
| Pigment | P.Y. 74 | 3 | — | — | — | 3 | — | — | — |
|  | P.V. 19 | — | 3 | — | — | — | 3 | — | — |
|  | P.B. 15:3 | — | — | 3 | — | — | — | 3 | — |
|  | P.B. 7 | — | — | — | 3 | — | — | — | 3 |
| Pigment dispersant | | 1.5 | 1.5 | 1.5 | 1.5 | 1.5 | 1.5 | 1.5 | 1.5 |
| Glycerin | | 15 | 15 | 15 | 15 | 15 | 15 | 15 | 15 |
| 1,2-hexanediol | | 15 | 15 | 15 | 15 | 15 | 15 | 15 | 15 |
| BYKUV 3510 | | 0.1 | 0.1 | 0.1 | 0.1 | 0.1 | 0.1 | 0.1 | 0.1 |
| Ultrapure water | | Balance | Balance | Balance | Balance | Balance | Balance | Balance | Balance |

In the table, pigment dispersant represents styrene-acrylic acid dispersed resin.

TABLE 5

| Additive ingredients | | Ex. 25 | Ex. 26 | Ex. 27 | Ex. 28 | Ex. 29 | Ex. 30 | Ex. 31 | Ex. 32 |
|---|---|---|---|---|---|---|---|---|---|
| Resin emulsion | 7 | 0.6 | 0.6 | 0.6 | 0.6 | — | — | — | — |
|  | 8 | — | — | — | — | 0.6 | 0.6 | 0.6 | 0.6 |
| Pigment | P.Y. 74 | 3 | — | — | — | 3 | — | — | — |
|  | P.V. 19 | — | 3 | — | — | — | 3 | — | — |
|  | P.B. 15:3 | — | — | 3 | — | — | — | 3 | — |
|  | P.B. 7 | — | — | — | 3 | — | — | — | 3 |
| Pigment dispersant | | 1.5 | 1.5 | 1.5 | 1.5 | 1.5 | 1.5 | 1.5 | 1.5 |
| Glycerin | | 15 | 15 | 15 | 15 | 15 | 15 | 15 | 15 |
| 1,2-hexanediol | | 15 | 15 | 15 | 15 | 15 | 15 | 15 | 15 |
| BYKUV 3510 | | 0.1 | 0.1 | 0.1 | 0.1 | 0.1 | 0.1 | 0.1 | 0.1 |
| Ultrapure water | | Balance | Balance | Balance | Balance | Balance | Balance | Balance | Balance |

In the table, pigment dispersant represents styrene-acrylic acid dispersed resin.

TABLE 6

| Additive ingredients | | Comp. Ex. 1 | Comp. Ex. 2 | Comp. Ex. 3 | Comp. Ex. 4 |
|---|---|---|---|---|---|
| Resin emulsion 9 | | 0.6 | 0.6 | 0.6 | 0.6 |
| Pigment | P.Y. 74 | 3 | — | — | — |
|  | P.V. 19 | — | 3 | — | — |
|  | P.B. 15:3 | — | — | 3 | — |
|  | P.B. 7 | — | — | — | 3 |
| Pigment dispersant | | 1.5 | 1.5 | 1.5 | 1.5 |
| Glycerin | | 15 | 15 | 15 | 15 |
| 1,2-hexanediol | | 15 | 15 | 15 | 15 |
| BYKUV 3510 | | 0.1 | 0.1 | 0.1 | 0.1 |
| Ultrapure water | | Balance | Balance | Balance | Balance |

In the table, pigment dispersant represents styrene-acrylic acid dispersed resin.

(4) Evaluation of Prints

<Evaluation of Gloss>

In an application, Japanese Patent Application No. 412330/2003, the present inventors have proposed an image evaluation method wherein an evaluation result of a recorded image is substantially in agreement with a visual evaluation result in view of glossiness of recorded images.

An evaluation of gloss for the ink compositions thus obtained was carried out by using the above image evaluation method as follows.

The ink compositions thus obtained were loaded into an ink cartridge of an ink jet printer (PX-G900, manufactured by Seiko Epson Corporation). A single color of duty 80% was printed on photo paper (L-type, manufactured by Seiko Epson Corporation) with a resolution of 1440×1440 dpi.

For the records thus obtained, the reflected light intensity at a reflection angle of 42 to 48 degrees was measured under conditions of incident angle 45 degrees (slit width: incident side 1 mmφ, reflection side 1.5 mmφ), sensitivity 500, and elevation angle 0 degree with an automatic angle changing photometer (GP-200, manufactured by Murakami Color Research Laboratory). At that time, a 12V-50 W halogen lamp was used as a light source, and ND-10 was used as a filter. The voltage applied to the light source was regulated so that the gloss of a standard plate was 42.5. The gloss of the record refers to the highest value among the values of the reflected light intensity measured under the above measuring conditions. The reproduction error was not more than ±2.0.

The glossy impression of the record was calculated by the following equation.

$$\text{Glossy impression} = (\text{gloss})/(\text{sharpness level})^2$$

Here the gloss refers to gloss as measured by the above method. The sharpness level is the degree of sharpness of the recorded image (also known as image clarity) and refers to the width of reflection angles which give a reflected light intensity of not less than 0.6 among the values of the reflected light intensity measured in the measurement of the gloss. The glossy impression calculated by the above equation is substantially in agreement with glossiness evaluated visually by the human's eye. The evaluation was carried out according to the following criteria.

A: The average of glossy impression of secondary color was not less than 4.0.

B: The average of glossy impression of secondary color was not less than 3.5 and less than 4.0.

C: The average of glossy impression of secondary color was not less than 3.0 and less than 3.5.

D: The average of glossy impression of secondary color was less than 3.0.

The results of evaluation of glossy impression were as shown in Table 7 below.

<Evaluation of Rubbing/Scratch Resistance>

The ink compositions thus obtained were loaded into an ink cartridge of an ink jet printer (PX-G900, manufactured by Seiko Epson Corporation). A single color of duty 80% was printed on 100 sheets of photo paper (L-type, manufactured by Seiko Epson Corporation) with a resolution of 1440×1440 dpi. The records were dried for one hr and were rubbed with one another as if cards were shuffled. When there was substantially no scratch, the rubbing/scratch resistance was evaluated as A; and when scratches significantly occurred, the rubbing/scratch resistance was evaluated as B. The results of evaluation of the rubbing/scratch resistance were as shown in Table 7 below.

<Evaluation of Fixation>

The ink compositions thus obtained were loaded into an ink cartridge of an ink jet printer (PX-G900, manufactured by Seiko Epson Corporation). A single color of duty 80% was printed on photo paper (L-type, manufactured by Seiko Epson Corporation) with a resolution of 1440×1440 dpi. After printing, the records were allowed to stand for 2 min. Thereafter, a mending tape of an acrylic pressure-sensitive adhesive agent (manufactured by SCOTCH) was applied to the printed face and was then immediately peeled off. In this case, when the coloring material was not separated, the fixation was evaluated as A; and when the coloring material was separated, the fixation resistance was evaluated as B. The results of evaluation of the fixation were as shown in Table 7 below.

TABLE 7

| | Reactive emulsifier/ ethylenically unsaturated monomer | Glossy impression | Rubbing/ scratch resistance | Fixation |
|---|---|---|---|---|
| Example 1 | Sulfuric ester group + polyoxyethylene/ methacrylic monomer | A | A | A |
| Example 2 | Sulfuric ester group + polyoxyethylene/ methacrylic monomer | A | A | A |
| Example 3 | Sulfuric ester group + polyoxyethylene/ methacrylic monomer | A | A | A |
| Example 4 | Sulfuric ester group + polyoxyethylene/ methacrylic monomer | A | A | A |
| Example 5 | Sulfuric ester group + polyoxyethylene/ methacrylic monomer | A | A | A |
| Example 6 | Sulfuric ester group + polyoxyethylene/ methacrylic monomer | A | A | A |
| Example 7 | Sulfuric ester group + polyoxyethylene/ methacrylic monomer | A | A | A |
| Example 8 | Sulfuric ester group + polyoxyethylene/ methacrylic monomer | A | A | A |
| Example 9 | Polyoxyethylene group/ methacrylic monomer | B | A | A |
| Example 10 | Polyoxyethylene group/ methacrylic monomer | B | A | A |
| Example 11 | Polyoxyethylene group/ methacrylic monomer | B | A | A |
| Example 12 | Polyoxyethylene group/ methacrylic monomer | B | A | A |
| Example 13 | Sulfuric ester group + polyoxyethylene group/ alkoxysilane-containing monomer | B | A | A |
| Example 14 | Sulfuric ester group + polyoxyethylene group/ alkoxysilane-containing monomer | B | A | A |
| Example 15 | Sulfuric ester group + polyoxyethylene group/ alkoxysilane-containing monomer | B | A | A |
| Example 16 | Sulfuric ester group + polyoxyethylene group/ alkoxysilane-containing monomer | B | A | A |
| Example 17 | Polyoxyethylene group/ alkoxysilane-containing monomer | B | A | A |
| Example 18 | Polyoxyethylene group/ alkoxysilane-containing monomer | B | A | A |
| Example 19 | Polyoxyethylene group/ alkoxysilane-containing monomer | B | A | A |
| Example 20 | Polyoxyethylene group/ alkoxysilane-containing monomer | B | A | A |
| Example 21 | Polyoxyethylene group/ methacrylic monomer/ no chain transfer agent | C | A | A |
| Example 22 | Polyoxyethylene group/ methacrylic monomer/ no chain transfer agent | C | A | A |
| Example 23 | Polyoxyethylene group/ methacrylic monomer/ no chain transfer agent | C | A | A |
| Example 24 | Polyoxyethylene group/ methacrylic monomer/ no chain transfer agent | C | A | A |

TABLE 7-continued

| | Reactive emulsifier/ ethylenically unsaturated monomer | Glossy impression | Rubbing/ scratch resistance | Fixation |
|---|---|---|---|---|
| Example 25 | Sulfuric ester group + polyoxyethylene group/ alkoxysilane-containing monomer/no chain transfer agent | C | A | A |
| Example 26 | Sulfuric ester group + polyoxyethylene group/ alkoxysilane-containing monomer/no chain transfer agent | C | A | A |
| Example 27 | Sulfuric ester group + polyoxyethylene group/ alkoxysilane-containing monomer/no chain transfer agent | C | A | A |
| Example 28 | Sulfuric ester group + polyoxyethylene group/ alkoxysilane-containing monomer/no chain transfer agent | C | A | A |
| Example 29 | Polyoxyethylene group/ alkoxysilane-containing monomer/no chain transfer agent | C | A | A |
| Example 30 | Polyoxyethylene group/ alkoxysilane-containing monomer/no chain transfer agent | C | A | A |
| Example 31 | Polyoxyethylene group/ alkoxysilane-containing monomer/no chain transfer agent | C | A | A |
| Example 32 | Polyoxyethylene group/ alkoxysilane-containing monomer/no chain transfer agent | C | A | A |
| Comparative Example 1 | Nonreactive emulsifier | D | B | B |
| Comparative Example 2 | Nonreactive emulsifier | D | B | B |
| Comparative Example 3 | Nonreactive emulsifier | D | B | B |
| Comparative Example 4 | Nonreactive emulsifier | D | B | B |

What is claimed is:

1. An ink composition comprising: (i) a resin produced by emulsion polymerization of an ethylenically unsaturated monomer in the presence of (a) a reactive emulsifier comprising a hydrophilic group, a hydrophobic group and a radical reactive group and (b) a chain transfer agent; (ii) water; and (iii) a pigment, wherein
the weight average molecular weight of the resin is 30,000 to 70,000, and the reactive emulsifier is selected from the group consisting of the following compounds:

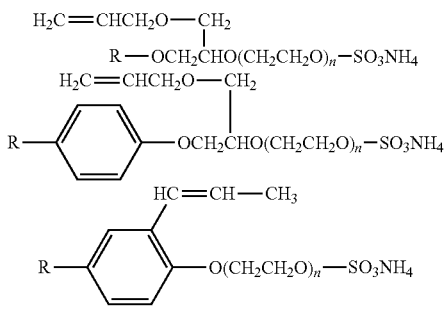

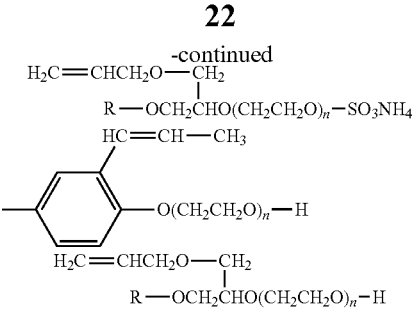

wherein R represents a $C_5$ to $C_{20}$ alkyl group and n is an integer of 5 to 40.

2. The ink composition according to claim 1, wherein the hydrophilic group is selected from sulfuric ester, and polyoxyethylene groups.

3. The ink composition according to claim 1, wherein the ethylenically unsaturated monomer is selected from alkyl (meth)acrylates, unsaturated carboxylic acids and alkoxysilane group-containing monomers.

4. The ink composition according to claim 1, wherein the chain transfer agent is selected from the group consisting of mercaptans, xanthogen disulfides, thiuram disulfides, carbon tetrachloride, 1,1-diphenylethylene, α-methylstyrene dimer and 2-ethylhexylthioglycolate.

5. The ink composition according to claim 1, wherein the resin is present in an emulsion form in the ink composition.

6. The ink composition according to claim 1, which further comprises a penetrating solvent and/or a surfactant.

7. The ink composition according to claim 6, wherein the penetrating solvent is an alcohol compound containing an alkyl group having 5 to 10 carbon atoms.

8. The ink composition according to claim 6, wherein the surfactant is an ether-modified organosiloxane compound.

9. An ink jet recording method comprising the steps of: ejecting droplets of an ink composition; and depositing the droplets onto a recording medium to perform printing, the ink composition being an ink composition according to claim 1.

10. A record produced by recording using an ink jet recording method according to claim 9.

11. An ink composition comprising: (i) a resin emulsion produced by emulsion polymerization of an ethylenically unsaturated monomer in the presence of (a) a reactive emulsifier comprising a hydrophilic group, a hydrophobic group and a radical reactive group and (b) a chain transfer agent; (ii) water; and (iii) a pigment, wherein
the weight average molecular weight of the resin is 30,000 to 70,000, and the reactive emulsifier is selected from the group consisting of the following compounds:

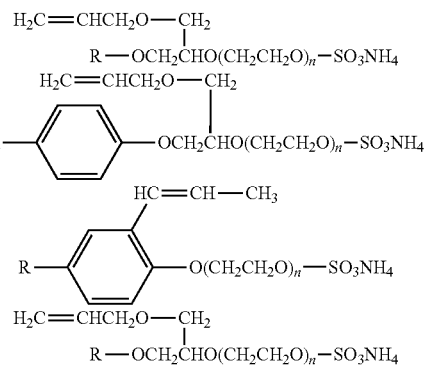

-continued

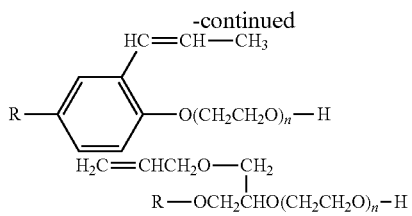

and wherein R represents a $C_5$ to $C_{20}$ alkyl group and n is an integer of 5 to 40.

12. The ink composition according to claim 1, wherein the presence of the chain transfer agent in the emulsion polymerization enables the ink composition to produce a recorded image in ink jet recording that appears more glossy than a recorded image produced with the ink composition when prepared without the chain transfer agent, the chain transfer agent being present in the emulsion polymerization in an amount of 0.1 to 10 parts by weight based on 100 parts by weight in total of the ethylenically unsaturated monomer and the reactive emulsifier.

13. The ink composition according to claim 4, wherein the presence of the chain transfer agent in the emulsion polymerization enables the ink composition to produce a recorded image in ink jet recording that appears more glossy than a recorded image produced with the ink composition when prepared without the chain transfer agent, the chain transfer agent being present in the emulsion polymerization in an amount of 0.1 to 10 parts by weight based on 100 parts by weight in total of the ethylenically unsaturated monomer and the reactive emulsifier.

14. The ink composition according to claim 11, wherein the presence of the chain transfer agent in the emulsion polymerization enables the ink composition to produce a recorded image in ink jet recording that appears more glossy than a recorded image produced with the ink composition when prepared without the chain transfer agent, the chain transfer agent being present in the emulsion polymerization in an amount of 0.1 to 10 parts by weight based on 100 parts by weight in total of the ethylenically unsaturated monomer and the reactive emulsifier.

15. The ink composition according to claim 14, wherein the chain transfer agent is selected from the group consisting of mercaptans, xanthogen disulfides, thiuram disulfides, carbon tetrachloride, 1,1-diphenylethylene, α-methylstyrene dimer and 2-ethylhexylthioglycolate.

16. The ink composition according to claim 1, wherein the reactive emulsifier is represented by the following formula:

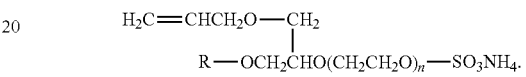

17. The ink composition according to claim 11, wherein the reactive emulsifier is represented by the following formula:

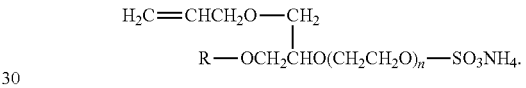

* * * * *